Feb. 21, 1939.                    J. R. ROSE                    2,148,278
                RECEPTACLE FOR COOLING AND TRANSPORTING LIQUIDS
                    Filed April 18, 1936           2 Sheets-Sheet 1
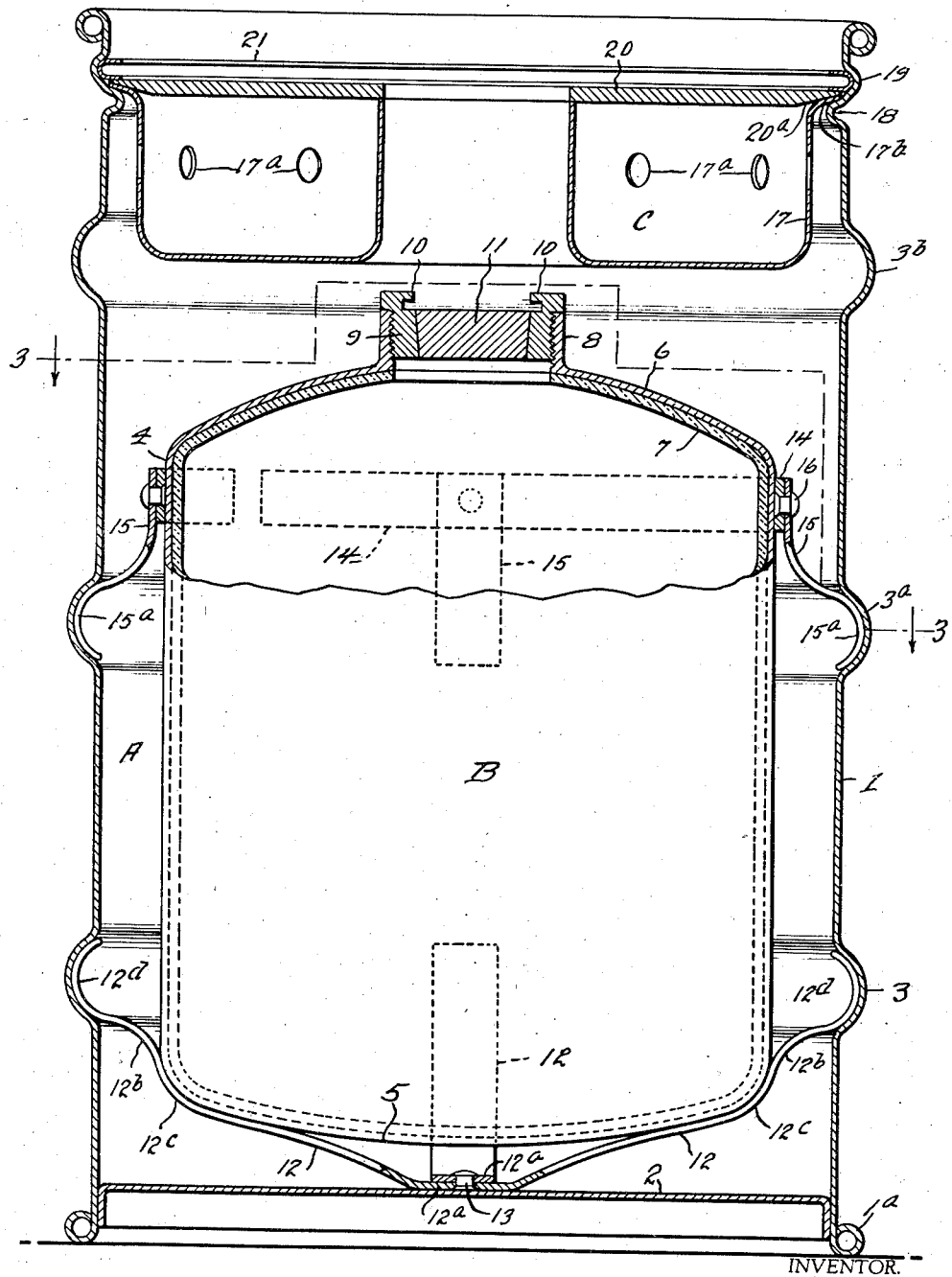
Fig. I
INVENTOR.
James R. Rose
By Hull, Buck & West
ATTORNEYS Feb. 21, 1939.　　　　　J. R. ROSE　　　　　2,148,278
RECEPTACLE FOR COOLING AND TRANSPORTING LIQUIDS
Filed April 18, 1936　　　2 Sheets-Sheet 2
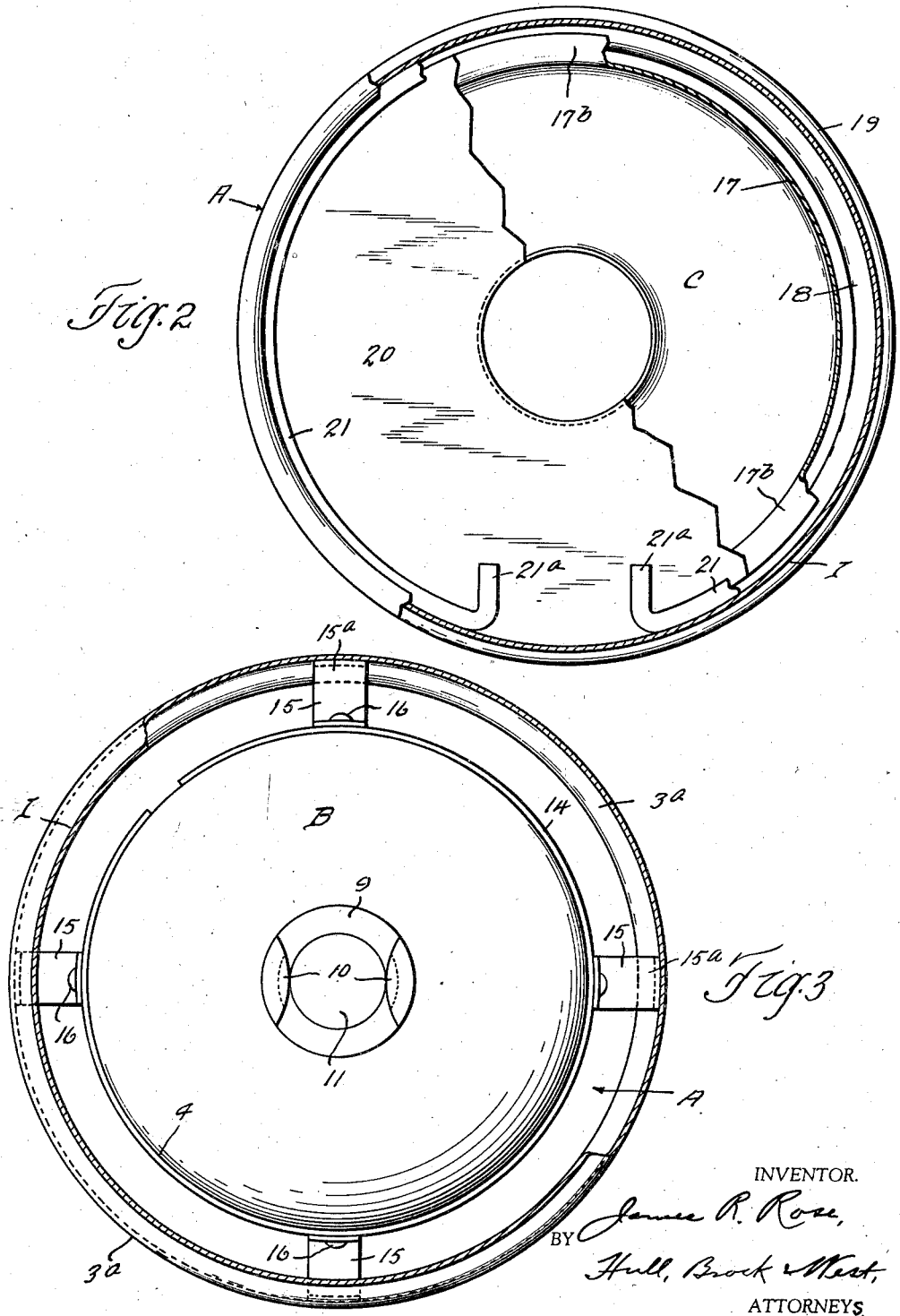
INVENTOR.
James R. Rose,
BY Hull, Brock & West,
ATTORNEYS.

Patented Feb. 21, 1939

2,148,278

UNITED STATES PATENT OFFICE 2,148,278

RECEPTACLE FOR COOLING AND TRANSPORTING LIQUIDS

James R. Rose, Edgeworth, Pa., assignor of one-half to Christopher A. Strobel, Akron, Ohio Application April 18, 1936, Serial No. 75,150

2 Claims. (Cl. 220—15)

This invention relates to receptacles for the cooling and transportation of beverages and has for its general object to provide a receptacle of the character thus identified whereby a vessel within said receptacle may be transported without breakage and injury and whereby the liquid in said vessel may be cooled in an efficient manner; also to provide a receptacle of the character thus identified wherein access may be had conveniently to the vessel within the receptacle for the purpose of dispensing the liquid therefrom.

Receptacles of the type to which my invention relates are those which are used for the shipment and dispensing of beer from vessels contained within said receptacles. The receptacle described herein and illustrated in the drawings hereof is particularly well adapted for use in connection with vessels containing this liquid. However, I do not intend, by reference to any particular liquid which may be contained in the vessel shown and described herein, to limit my invention to use with such liquid only.

In the drawings forming part hereof, Fig. 1 represents a central vertical section through a receptacle constructed in accordance with my invention and through a portion of the liquid-containing vessel mounted therein; Fig. 2 a plan view, with parts broken away, of the receptacle and vessel shown in Fig. 1; and Fig. 3 a detail in section corresponding substantially to the line 3—3 of Fig. 1.

The receptacle A is of metal and comprises a cylindrical body 1 having a bead 1ª at the bottom thereof constituting a supporting base, a bottom 2, and a special cover which will be described at length hereinafter. The cylindrical body 1 is provided with a plurality of outwardly extending arcuate ribs 3, 3ª and 3ᵇ which not only strengthen the receptacle, but which cooperate with the means for supporting and centering the liquid-containing vessel therewithin.

The liquid-containing vessel B consists of an outer metallic body 4, preferably of cylindrical shape and having a downwardly convex bottom 5 and an upwardly convex top 6. The vessel is provided with a lining 7, preferably of glass. The top 6 is provided with a neck 8 which is internally threaded for the reception of a bushing 9 having at its top opposed radially inwardly extending flanges 10. The bushing as thus constructed is adapted to receive a standard tap rod, such as is used for the dispensing of beer and similar liquids. The opening within the bushing is temporarily closed by means of a suitable removable plug 11.

The vessel thus described is resiliently and centrally mounted within the outer receptacle by the following construction: 12 denotes generally a pair of flat springs having their central portions depressed and flattened, as shown at 12ª, whereby the bottom spring is seated upon the bottom plate 2 of the receptacle and whereby the central portion of the upper spring may be conveniently connected to the central portion of the lower spring, as by means of the rivet 13. Each of the springs 12 has arms 12ᵇ extending upwardly from the central portion thereof and suitably curved as at 12ᶜ to engage the outer portion of the bottom of the vessel B. The upper ends of the arms 12ᵇ are bent to conform to the inner surface of the lower rib 3, as shown at 12ᵈ, and to exert a yielding pressure thereagainst. By this construction, the bottom of the vessel A is yieldingly supported and centered by the springs 12 while the springs are retained in proper position with reference to the receptacle A and the vessel B by means of the curved upper ends 12ᵈ of their arms.

The upper portion of the vessel B is resiliently supported and centered with respect to the receptacle A by means of a resilient split ring 14, which may be slipped over the top of the vessel, and by spring arms 15 secured to the said ring, as by rivets 16, each arm having its lower end bent, as shown at 15ª to conform to the inner surface of the rib 3ª to exert a yielding pressure thereagainst.

I prefer to cool the vessel and its contents by what is known to the trade as "dry ice", which may be placed within an annular receptacle C, the central opening of which registers with the neck 8 of the vessel B, thereby permitting the insertion through said central opening of a corkscrew or other suitable tool for removing the stopper and for permitting the insertion of the tap rod into the vessel and its removal therefrom. The outer wall 17 of the receptacle C is provided with openings 17ª permitting the passage of the cooling gases, evolved from the dry ice, downwardly and around the vessel B. At its upper end, this wall is flared outwardly, as shown at 17ᵇ, thereby to engage the upper wall of an inwardly projecting rib or bead 18 on the receptacle A. The upper wall of the rib 18 constitutes the lower wall of an outwardly projecting rib or bead 19.

20 denotes an annular cover for the receptacle C, the bottom peripheral portion of said cover being beveled upwardly as shown at 20ª to conform to the inclination of the flange 17ᵇ at the top of the wall 17 of said receptacle. The receptacle C and the cover are held in place by means of a channeled split snap ring 21 having its ends provided with integral fingers whereby the ring may be compressed and reduced in diameter for insertion into and removal from its seat in the rib 19.

If desired, the receptacle C may be omitted, should it be desirable to use ice as the means for cooling the vessel B and its contents. In such case, an imperforate cover could be substituted for the cover 20.

Having thus described my invention, what I claim is:

1. The combination, with a receptacle having a bottom wall, of a liquid-containing vessel mounted within and spaced from the outer wall of said receptacle, flat springs having their central portions located one above the other and connected together, said springs being interposed between the bottom of the vessel and the bottom of the receptacle and engaging the bottom of the receptacle and having arms extending upwardly and engaging the bottom of the vessel adjacent to the sides thereof and being extended upwardly beyond the bottom of the vessel, said upwardly extending ends being outwardly curved and the receptacle having an outwardly projecting seat above the bottom of the vessel for the outwardly curved end portions of the said arms, and a plurality of spring arms operatively connected to the upper portion of said vessel and projecting outwardly and downwardly therefrom and having their outer ends outwardly curved, said receptacle having an outwardly extending rib or bead providing a seat below the top of said vessel for the ends of the last mentioned spring arms.

2. In the combination set forth in claim 1, a band tightly encircling the upper portion of the vessel to which the upper spring arms are connected by means of which the arms are in turn connected to the upper portion of the vessel.

JAMES R. ROSE.